Oct. 3, 1967     LE ROY J. GOLDBECK     3,345,196
COATED POLYOLEFIN SHEETS PARTICULARLY FOR BOOK
COVERS AND METHOD OF PRODUCING THE SAME
Filed June 1, 1964
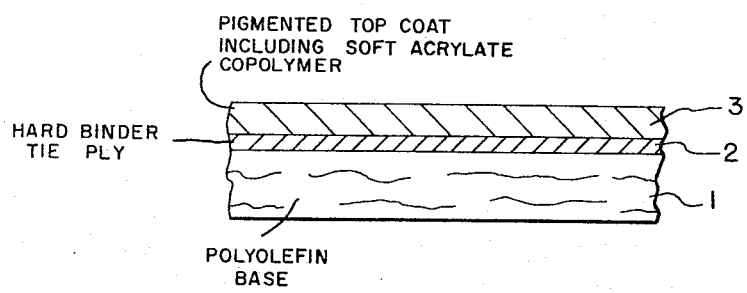

3,345,196
COATED POLYOLEFIN SHEETS PARTICULARLY FOR BOOK COVERS AND METHOD OF PRODUCING THE SAME
Le Roy J. Goldbeck, Neenah, Wis., assignor to Kimberly-Clark Corporation, Neenah, Wis., a corporation of Delaware
Filed June 1, 1964, Ser. No. 371,420
9 Claims. (Cl. 117—11)

ABSTRACT OF THE DISCLOSURE

Coated sheet material in which the base is a polyolefin and the coatings include a tie ply and a top coat both of which may be pigmented. The tie ply is harder than the top coat, providing a product of superior abrasion resistance. The production of such coated material for use as a book cover material in a process involving the use of nonionic emulsifying agents to aid printability of the product.

---

This invention relates to coated substrates and to such substrates having particular utility as book cover materials.

Book cover materials are required to possess a plurality of properties including: printability by known commercial processes and with conventional inks; receptivity to bindery adhesives and adaptability to automatic bindery processes; resistance to scuffing, abrasion, creasing, dirt pickup; washability, foldability; moderate heat resistance; resistance to picking; toughness; durability; and chemical stability. I have found that the foregoing and other desirable characteristics may be achieved utilizing a variety of substrates but employing a two-coat aqueous coating system and practicing certain precautions with respect to component materials and component quantity limitations.

It is, therefore, an object of the present invention to provide a coated substrate suitable for book cover material and similar applications having the foregoing noted required characteristics and which is relatively economical, may be embossed, and is subject to printing by lithographic processes.

I have found that the foregoing and other allied objects of the invention are attained by providing on the substrate as a tie ply an abrasion resistant ply which is a relatively hard coat; and then overlying or superposing a top coat which is of relatively soft coating material. Under such circumstances the soft top coating may be suitably pigmented, a factor which is important in providing the required printability. The hard underlying coat which may contain some pigment but is preferably essentially a binder imparts some rigidity to the overlying top coat and protects the substrate against physical damage. Such hard and soft coating materials are in themselves well known and of themselves form no part of the present invention, but are specifically described hereinafter for completeness and designation of their characteristics to the product of the invention.

The tie ply coating compositions which are useful include in accordance with my invention a combination of a hardness producing monomer with softness producing materials to somewhat modify the hardness characteristic of the tie ply in the polymer state while yet providing a high degree of abrasion and scuff resistance in such ply. Additionally, the tie play composition should include a cross-linking capacity. Hardness producing monomers which may be employed include the alkyl methacrylates including the methyl, ethyl, propyl, tertiary butyl and tertiary amyl; the acrylates such as tertiary butyl or tertiary amyl; styrene; acrylonitrile; methacrylonitrile; softening monomers useful in limited proportion with the hardness producing monomers for tie ply purposes include methyl acrylate, ethyl acrylate, N-butyl, sec-butyl and isobutyl acrylates. Importantly, the tie ply coating material should include, for combination with a substrate of polyolefin character in film or fiber form, reactive groups such as the amines, amides or epoxies; such provide for cross-linking upon cure. The tie ply coating is preferably a terpolymer including combinations of the foregoing hardness and softness producing monomers. In general, the tie ply is a binder material selected from hard acrylate copolymers. The appraisal of hardness is commonly effected by a consideration of forces necessary to produce a given stiffness in a plastic body. One characterization involves the $T_i$ temperature which is the transition or inflection temperature found by plotting the modulus of rigidity against temperature. One convenient method for determining modulus of rigidity and transition temperature is described by I. Williamson, British Plastics 23, 87–90, 102, September 1950. The $T_i$ value here used is that determined at 300 kilograms per centimeter squared. (See Patent 2,795,564.) The $T_i$ temperature for the tie ply material is suitably between about 20 and 38° C. and should be relatively high with respect to the $T_i$ value of the top coat.

Typical soft acrylates may be employed as the top ply. It is to be noted that the softness producing components of the top layer are suitably copolymers which are of sufficient softness to adequately provide for surrounding, imbedding and protection of pigment particles. Toleration of a significant proportion of pigment is provided by binders such as the soft acrylates. Such include ethyl acrylate, N-butyl acrylate, octyl acrylate, copolymers of such acrylates, and copolymers and terpolymers of these acrylates with acrylonitrile. The soft polymer should have a second order transition temperature $T_i$ of between about $-10°$ C. and $+15°$ C.; the higher values are useful when values of $T_i$ in the high end of the range characterize the composition of the tie ply.

Particularly important is that for printability, opacity and embossing of the product, the quantity of pigment be limited and selective in nature. I have found that the top coating preferably includes a combination of calcium carbonate, titanium dioxide, and clay. The calcium carbonate aids in the drying of inks used in printing; the titanium dioxide provides a large opacity increase with a minor volume of pigment; clay both aids printability and minimizes cost. Pigments also provide a surface useful in lithographic printing; for such lithographic purposes I have found that the top coat emulsion should be nonionic for best receipt of the printing ink. It appears that the binder-pigment relationships are relatively critical when the binder is in excess of that needed simply to retain the pigment—that is when the binder is employed to provide desired characteristics of foldability, tie ply adhesion and scuff resistance, as it is in book cover materials. At low binder contents relative to the pigment, printability by offset processes is apparently influenced primarily by the pigment, but as binder content increases to above about 20 to 30 percent of the pigment weight (depending on the particular pigment) the binder is required to have a non-ionic character. Accordingly, the emulsifying agents for the top coating, in such instance, are selected to be non-ionic.

The general appearance of the product is improved by providing a portion of the pigment in the tie coating. Such may include either clay or titanium dioxide or both. Calcium carbonate is preferably avoided in the tie ply as it tends to flocculate. However, it is not critical that the tie ply contain pigment and all of the pigment may be utilized in the top coat. It is important, however, that the opacity of the final product for book cover purposes should be at least 92, and preferably 95, Bausch and Lomb opacimeter. Opacities of 97 have been attained by the practice of this invention.

Where pigment is employed in the tie ply, a lesser amount of pigment may be employed in the top coat. I have found that the proportion of pigment in the two coatings should be limited and that the proportion of pigment in the tie ply may vary from about zero to about one part by weight per one part by weight of binder in the tie ply. The pigment in the top ply is thus dependent upon the amount of pigment in the tie ply and may suitably vary from about ½ to 1½ parts by weight per part by weight of binder in the top ply. In any event, the ratio by weight for the above mentioned pigments and for the combination of the two coats should be limited to not more than about two parts by weight of pigment to one part by weight of binder. The minimum pigment which is present in a suitable book cover material is about ½ part by weight of pigment per one part by weight of binder in the top ply. The maximum pigment in the top ply is relatively critical and should not generally exceed about 1½ parts by weight of pigment per one part by weight of binder. Excess pigment in the top ply hardens the top ply and inhibits transmission of forces to the tie ply and base, unduly stressing the top ply. The foregoing proportions may vary somewhat with the particular nature of the pigments but the limitations are relatively critical when employing the above specifically mentioned pigments in producing quality book cover material. It is to be noted thta adhesion of both tie ply and top ply improve as pigment is eliminated but opacity is too low for conventional book covers. Further, the elimination of pigment results in a high cost as well as inducting water insensitivity in the coatings, leading to difficulty in two-color offset press work particularly at the second press station.

The aging of the substrate and tie ply I have found to be generally necessary in order to procure suitable adhesion of the tie ply and substrate. The particular nature of the substrate affects the time of aging necessary to secure good adhesion. Also, the conditions of the atmosphere and temperature under which aging takes place are not a particular factor; aging is effected in a dry or humid atmosphere. Where the base sheet is a synthetic such as one formed of polyethylene film or fibers, aging for at least 24 hours is required. The effect of aging on adhesion is readily determined by subjecting samples at varying times after cure to adhesion tests with a simple iron wheel. In such tests an iron wheel loaded to 800 pounds per square inch is passed back and forth twice over No. 400 Scotch filament tape, which tape is attached to the coating. Commonly, if the coating is suitably adhered, the tape will be stripped, leaving the coating or coatings undamaged. Both plies may be checked for adhesion together or, more suitably, the critical tie ply adhesion may be checked separately from the adhesion of the component plies.

In more specific aspect: the substrate may be of polyethylene fibers, polyethylene film, polypropylene film and the like polyolefins. Such are flame-treated or otherwise prepared (corona discharge) to oxidize the surface to which the relatively hard tie coat is to be applied; such treatment improves adhesion of the tie ply to the substrate which substrate is normally not respective to aqueous systems.

The tie ply coating s applied in the form of an aqueous emulsion which includes an acid reacting catalyst such as ammonium chloride, ammonium thiocyanate or oxalic acid; the pH upon cure is 7 or less, preferably below 6.5, and in the range of about 2.8 to about 6.5. Useful emulsion systems include in percent by weight:

(A)

| | |
|---|---|
| Ethyl acrylate | 58 |
| Methyl methacrylate | 37 |
| Acrylamide | 4 |
| Styrene | 11 |

The emulsion is about 46% solids.

(B)

| | |
|---|---|
| Methyl methacrylate | 70 |
| 2-ethyl hexyl acrylate | 25 |
| Methylacrylamide | 5 |

(Solids about 46%.)

Emulsion polymers of this type are known and may be prepared as illustrated in U.S. Patent 3,033,811.

The top coat composition may include aqueous emulsion systems having by weight:

(C)

| | |
|---|---|
| Ethyl acrylate | 83 |
| Methyl methacrylate | 15 |
| Methacrylic acid | 2 |
| Solids | 46 |

Preferably, however, the top coat includes not only a softer copolymer as in (C) above, but also a proportion of a harder copolymer such as either that of (A) or (B) above or a proportion of vinyl acetate, for example. Also, a plurality of copolymers having a $T_i$ value of 15° or less such as those described in U.S. Patent 2,790,736, may be employed alone or in combination in the top ply.

The emulsifying agents for the copolymers for products printable by lithographic processes, as already noted, should be non-ionic. Such may be selected from a large class of materials including alkylphenoxypolyethoxyethanols having alkyl groups of about 7 to 18 carbon atoms and about 6 to 60 oxyethylene units such as nonylphenoxypolyethoxyethanol and diamylphenoxypolyethoxyethanol.

I have found that the harder tie coats having high $T_i$ values of 30 to 38 are to be preferred and that for adhesion to the polyolefin base materials at least 3% to 10% of a component containing amide, amine or epoxy groups is desired. The most serious limitation on the top coat is that it should not be hardened excessively by pigment inclusion and, therefore, the pigment content must be limited as already noted.

I have found that, when the top coats and tie coats such as those described above are interchanged on the substrate, adhesion is inferior as is abrasion resistance of the coated substrate. I attribute this action to the inability of a harder top ply to transmit and distribute forces imposed on it.

In the single figure of the drawing the product of the invention is represented in cross-section. The numeral 1 denotes a base sheet of polyethylene fibers having a tie ply coating 2 and a top coating 3. It will be understood that the drawing is representative only and that the thicknesses, while in proportion, are exaggerated.

*Example 1*

A preferred specific embodiment of the invention is practiced by treating a nonwoven polyethylene fiber base sheet with a first aqueous emulsion coat, followed by drying and the application of the second aqueous emulsion coat of softer characteristics. Only one side is coated for book cover purposes. The coating applications may be by any of several types of coaters such as a wire wound rod coater or an air knife, blade or roll coater.

The polyethylene fiber base sheet initially has an opacity (Bausch & Lomb) of about 89–90 and a square yard weight of about 2 ounces and a thickness of about 6½ mils. This base is coated with a formulation as follows, the quantities being listed on both a dry and wet basis:

|  | Parts by Weight | |
|---|---|---|
|  | Dry | Wet |
| Clay (Spray Satin) | 12.5 | 12.5 |
| Titanium Dioxide | 12.5 | 12.5 |
| Hard acrylic copolymer: ethyl acrylate, 48%; methyl methacrylate, 37%; acrylamide, 4%; styrene, 11% | 90 | 200 |
| Oxalic acid | 1 | 1 |
| Sodium hexametaphosphate | 0.125 | 0.125 |
| Water |  | 25 |

The viscosity of such coating composition is 70 centipoises at 22° C. at 30 r.p.m. as measured with a Brookfield #3 spindle; the coat weight is about 1 ounce per square yard.

To prepare the tie ply coat formulation, the dispersant, sodium hexametaphosphate, is dissolved in water and the pigment is then added to form a slurry while stirring at room temperature; this slurry is opaque and creamy. Mixing requires normally about 30 minutes. The slurry is then fed to a colloid to effect optimum dispersion. The acrylic binder is then added; the binder is added at room temperature while agitating the composition.

After application of the tie ply composition, the coating is dried at about 120° C. to initiate the cure; the opacity of the base sheet by the application of such coating is increased to about 91–92 (Bausch and Lomb). The thickness of the material is only increased slightly—about ⅓ of a mil—by this tie ply coating; the sheet increases somewhat in stiffness.

Initially, the coating adherence is poor due in large measure to the hydrophobic nature of the base sheet; however, after drying and storing for about 24 hours, adhesion develops rapidly.

The application of the top coat may be made to the dry tie ply without the necessity of aging of the tie ply. To the dry tie ply coat there is applied by roll coat procedures the following composition:

|  | Parts by Weight | |
|---|---|---|
|  | Dry | Wet |
| Clay (Spray Satin) | 16.66 | 16.66 |
| Calcium carbonate | 16.66 | 16.66 |
| TiO₂ | 16.66 | 16.66 |
| Soft acrylic copolymer: ethyl acrylate, 83%; methyl methacrylate, 15%; methacrylic acid, 2% | 19.1 | 41.6 |
| Modifying hard acrylic copolymer: ethyl acrylate, 48%; methyl methacrylate, 37%; acrylamide, 4%; styrene, 11% | 18.7 | 41.6 |
| Sodium hexametaphosphate | 0.25 | 0.25 |
| Water |  | 50 |

The viscosity of such composition is about 80 centipoises at 22° C. at 30 r.p.m. as measured with a Brookfield #2 spindle; the coat weight of the top ply is about 2 ounces per square yard.

The emulsions of the soft acrylic copolymer and the modifying hard acrylic copolymer are preferably mixed at room temperature and combined in the coating composition by simple agitation.

Wetting of the tie ply by the top coat causes the two coats to become intimately united.

Drying and initiation of the cure of the top coat is at a temperature of about 120° C. The drying is an important consideration as too low a temperature results in inferior bonding and too high a temperature degrades the base sheet. Suitably, the drying action is carried out in a tunnel dryer at temperatures in the range of 100 to about 130° C. The overall thickness of the product is about 7.5 mils; the stiffness is increased slightly by the top coat but not significantly as far as book cover application is concerned.

Example 2

Example 1 is repeated except that the top coating formulation is as follows:

|  | Parts by Weight | |
|---|---|---|
|  | Dry | Wet |
| Clay (Spray Satin) | 16.66 | 16.66 |
| Titanium dioxide | 16.66 | 16.66 |
| Calcium carbonate | 16.66 | 16.66 |
| Soft acrylic copolymer emulsion: ethyl acrylate, 83%; methyl methacrylate, 15%; methacrylic acid, 2% | 18.7 | 41.6 |
| Modifier (hard): vinyl acetate emulsion (51.5% solids) | 18.7 | 36.3 |
| Sodium hexametaphosphate | .25 | .25 |
| Water |  | 50 |

The top coated, dried aged product exhibits an opacity of 95 to 97, is crease and tear resistant, readily printed, embossed and resists separation between plies. The product in this instance is more stiff than in the case of Example 2 and has a somewhat harder surface but materially less hard than the tie ply.

The product preferably is then embossed at a temperature in the range of about 140–160° F. to provide a cloth-like smooth surface. The opacity of the product is about 95 (Bausch and Lomb). Embossing for book covers may take place before or after aging.

I have found that very suitable hard tie ply coats may be produced from commercially supplied polymers such as Rhoplex AC–201 and Rhoplex HA–16, which are products of the Rohm and Haas Company, Philadelphia, Pa. Rhoplex AC–201 is a thermosetting polymer exhibiting a $T_1$ of about 38° C. and includes a self-crosslinking agent; Rhoplex HA–16 is self-crosslinking and exhibits a $T_1$ value of about 30° C. Also, products sold under the trademark Hycar 2600X84 by the B. F. Goodrich Company are useful as the tie ply component.

The top coat is conveniently produced utilizing a vinyl acetate emulsion such as Geon 970x11. The softer acrylic for the top coat is commercially available as Rhoplex B–15, also a product of the Rohm and Haas Company.

Tests on the product of the invention such as the previously described loaded wheel test indicate the utility of the product for those applications wherein considerable handling and exposure of the product to conditions of wear are apt to occur. Thus the product has utility for maps, charts, labels and the like.

A "thumb-nail" test in which the product of invention is folded around the edge of a thin board (100 mils) and the edge at the fold is scraped with a finger-nail indicates the relative utility of the product. In a suitable material the same edge surface may be scraped several times without removal of any material; in a poor result all of the coating may scrape off with one to three movements of the finger. As already noted, the reversal of the hard and soft coats as described in this application always results in failure of the type indicated above while a hard underlying coat serves the purpose while retaining flexibility and adhesion in the laminate. I consider that the fact that the tie ply does not penetrate the base sheet but rather lies upon and is adhered to it contributes to retention of flexibility. By the term "non-reversible" or "irreversible" as employed herein and in the appended claims I mean that if the top ply and tie ply formed in accordance with the invention were reversed or interchanged the product would be unsuitable for its intended abrasion resistant function.

The abrasion resistance is itself primarily dependent upon the hard and soft relationship of the plies while the adhesion of the tie ply coat is dependent upon the inclusion of some cross-linking agent such as an amine, amide or epoxy component introduced preferably as a monomer.

I have found that the presence of carboxy (or hydroxyl groups) is of itself insufficient to provide adequate adhesion to a base sheet of polyolefin material even though the latter is made adhesive receptive by flame treatment or corona discharge. At least a small amount of cross-linking agent such as the amides, amines or epoxies should be present even with the carboxyls.

The final product for book cover usage commonly comprises by weight between about 14 to 20 percent tie ply coat, 20 to 35 percent top coat, the balance being the polyethylene base sheet. Such proportions are indicative of the several characters of the material for book cover use, but obviously may be varied for other purposes where differing requirements of flexibility, creasing, resistance to scuffing and the like, exist.

It will be understood that this invention is susceptible to modification in order to adapt to different usages and conditions, and accordingly, it is desired to comprehend such modifications within the invention as may fall within the scope of the appended claims.

What is claimed is:

1. In a flexible, durable printable coated polyolefin sheet product which is abrasion resistant and adapted to be embossed, a binder tie ply coat adhered to the polyolefin sheet without significant penetration of the sheet and comprising a binder selected from the group of hard acrylate polymers and including a small proportion by weight of a functional group monomer in which the functional group is a cross-linking agent whereby said tie ply coat is adhered to said sheet, and a top coat over said tie ply coat and adhered thereto, said top coat comprising at least one soft acrylate copolymer binder and exhibiting a soft characteristic relative to said tie ply coat, at least said top coat containing an opacifying pigment and said pigment being distributed throughout the top coat and retained by said binder, the ratio by weight of pigment to total binder in the top coat and tie ply coat being 2:1 or less, said soft top coat and hard tie ply coat being irreversible as to their relative positions without material loss in abrasion resistance of the superposed coats.

2. The sheet product as claimed in claim 1 and in which the ratio of pigment to binder in the top coat is at least ½:1 by weight and the tie ply also includes opacifying pigment.

3. The sheet product as claimed in claim 1 and in which the tie ply coat is free of pigment and the ratio of pigment weight to total binder weight in the top coat is 1½:1 or less but not less than ½:1, the tie ply binder material having a $T_1$ value between about 20° C. and 38° C. and the copolymer binder of the top ply having a $T_1$ value of between about −10° C. and +15° C.

4. The sheet product as claimed in claim 3 and wherein the functional group monomer is acrylamide and the $T_1$ value of the tie ply is between about 30° C. to 38° C.

5. A sheet product as claimed in claim 1 and in which the pigment in the top coat includes clay, titanium dioxide and calcium carbonate and the product has a Bausch and Lomb opacity of at least 92.

6. A sheet product as claimed in claim 1 and in which the tie ply coat includes substantial amounts by weight of titanium dioxide and clay and such pigment content is approximately in the weight ratio of less than 1:1 with respect to the binder.

7. A sheet product as claimed in claim 1 and in which the tie ply coat constitutes about 14 to 20% by weight of the product, the top coat constitutes about 20 to 35% by weight and the balance is the polyolefin sheet, the polyolefin sheet being polyethylene.

8. The process of preparing book cover material which comprises:
(a) applying as a coating to an adhesive receptive polyolefin base sheet, as a binder composition, an aqueous acidic emulsion selected from the group of hard acrylate copolymers and having a non-ionic emulsifying agent, said copolymers containing at least 3% by weight of a functional group monomer in which the functional group is an amine, an amide or an epoxy;
(b) drying said coating on said base;
(c) overlying said dried coating with a binder material containing pigment and which binder material includes a soft acrylate copolymer, said acrylate comprising a lower alkyl ester of acrylic acid wherein the alkyl radical contains between one and eight carbon atoms, the pigment being present to the extent of at least ½ part by weight per part of binder to not more than 2 parts by weight of pigment per part of binder;
(d) drying the top coating; and
(e) aging and embossing the top coating.

9. The process according to claim 8 and in which the aging step is carried out after the application and drying of the first applied coating and before overlying of the first coating with the second coating material.

References Cited

UNITED STATES PATENTS

| | | |
|---|---|---|
| 2,790,736 | 4/1957 | McLaughlin et al. ____ 117—155 |
| 2,829,069 | 4/1958 | Michel _____ 117—76 |
| 3,033,811 | 5/1962 | Brown et al. _____ 260—29.4 |
| 3,222,211 | 12/1965 | Updegrove et al. ____ 117—138.8 |

MURRAY KATZ, *Primary Examiner.*